Aug. 6, 1935.  E. E. TEMPLE  2,010,044
CONTROL SYSTEM FOR RADIO RECEIVING INSTRUMENTS
Filed June 28, 1932   5 Sheets-Sheet 2

INVENTOR.
E. E. Temple
BY Rollander + Stratton
ATTORNEYS.

Aug. 6, 1935.   E. E. TEMPLE   2,010,044
CONTROL SYSTEM FOR RADIO RECEIVING INSTRUMENTS
Filed June 28, 1932   5 Sheets-Sheet 4

INVENTOR.
E. E. Temple
BY
Rollander & Stratton
ATTORNEYS.

Patented Aug. 6, 1935

2,010,044

UNITED STATES PATENT OFFICE 2,010,044

CONTROL SYSTEM FOR RADIO RECEIVING INSTRUMENTS

Ernest E. Temple, Denver, Colo.

Application June 28, 1932, Serial No. 619,634

12 Claims. (Cl. 250—20)

This invention relates to receiving instruments in systems of radio transmission, its primary object being in providing in association with a tuning element of the instrument, electrical means for a time-controlled selective operation of said element whereby any one or more of a plurality of broadcasting stations are automatically tuned in at predetermined selective intervals of time and during said intervals remain in tune, at the will of the operator of the receiving instrument.

By the use of this invention the owner of a radio receiving instrument may select from a list of programs published in newspapers or other publications those in which he is most interested and at the beginning of a day or other given period of time, set the instrument according to the times during which the programs are to be given, so that at the commencement of such times, the desired stations are automatically tuned in during the entire day or other given period without requiring further attention on the part of the operator.

It is a distinctive feature of the invention that the provision and use of the automatic controlling system interferes in no way with the ordinary operation of the receiving instrument. The reception of the instrument is not restricted to the stations affected by the automatic attachment, so that any station within the range of the instrument may be tuned in, independent of the attachment.

With the above and other objects in view, the invention comprises in electrical interconnection, a plurality of cooperative elements, principal among which is an electric clock connected in an ordinary lighting circuit, such as that in which the receiving instrument itself is connected, an electro-magnetic motor of novel design which turns the shaft of the tuning element or condenser of the instrument and whose circuit is controlled by the clock to be actuated at predetermined intervals; and a setting or controlling element, manually adjusted by the operator of the instrument at the beginning of the day or other given period, which determines the times at which the motor shall be actuated through the instrumentality of the clock and the lengths of the arcs through which the motor shall turn the tuning element in order to bring the desired stations into the instrument. In addition to the above enumerated elements, the system includes a relay acting as a switch for the motor circuit and an automatic switch which controls the circuit of the instrument.

An embodiment of the invention is illustrated in the accompanying drawings, in the several views of which like parts are similarly designated, and in which Figure 1 is a diagrammatic illustration of the elements and circuits in the system comprised in the invention, Figure 2, a plan view of the setting or controlling element above referred to, Figure 3, a side view of the element shown in Figure 2, Figure 4, an end view of the element, looking in the direction of the arrow 4 in Figure 2, Figure 5, a transverse section taken on the line 5—5, Figure 2, Figure 6, a similar section along the line 6—6, Figure 2, Figure 7, a section on the line 7—7, Figure 2, Figure 8, a section along the line 8—8, Figure 2, Figure 9, an enlarged, partially sectional and partially broken elevation of a part of the controlling element, the section being in the plane indicated by the line 9—9 in Figure 2, Figure 10, an end view of the setting or controlling element, looking in the direction of the arrow 10 in Figure 2, Figure 11, a section in the plane indicated by the line 11—11 in Figure 3, Figure 12, an enlarged section on the line 12—12 of Figure 5, Figure 13, a section along the line 13—13, of Figure 3, Figure 14, a sectional plan view in the plane indicated by the lines 14—14, in Figures 3 and 13, Figure 15, a partially broken section on the line 15—15, in Figures 2 and 6, Figure 16, a perspective view of a radio instrument to which the invention is applied, Figure 17, a face view of the motor which, as stated hereinbefore, functions to turn the shaft of the tuning element or condenser of the receiving instrument, Figure 18, a section taken on the line 18—18 of Figure 17, Figure 19, a section along the line 19—19, in Figure 18, Figure 20, a section partially broken on the line 20—20, Figure 18, Figure 21, a side elevation of the relay-switch for the motor circuit, and Figure 22, a section taken on the line 22, Figure 21.

Referring further to the drawings, the mechanical construction of the elements hereinbefore referred to, is as follows:

The controlling element comprises a shaft 5 mounted in suitable bearings inside the receiving instrument 9, and having at one end, a knob 6 projecting outside the instrument for manual rotation of the shaft. A dial 7 is fixed on the shaft rearward of a transparent window 8 in a side of the casing of the instrument beyond which the end of the shaft projects. This dial is peripherally graduated according to determinate divisions of a given period.

The scale of the dial shown in the drawings is divided into twelve equal parts representing the twelve hours of a day, and each of said parts is subdivided into four spaces, each representing a quarter of an hour of the day.

The transparent window has a fixed mark 10 to indicate the position of the dial by registering with the graduations of the same.

A sleeve 12, lengthwise, slotted, is slidably mounted on the shaft 6, a pin 13 on the latter projecting into the slot of the sleeve to cause the latter to rotate in conjunction with the shaft. The sleeve carries at one end, a fiber disk 14 and mounted upon this disk is a solenoid 15, the core 16 of which moves parallel to the axis of the shaft. At the forward end of core or plunger 16 of the solenoid is a lateral arm 17, the function of which will be later explained. The disk 14, furthermore, carries a pin 18 projecting from its face in parallel relation to the axis of the shaft for the purpose of resetting the operative parts of the element for renewed operation, after the operation of the automatic tuning system is completed at the termination of the given period.

Fixed with relation to the shaft and other movable parts of the element, are three parallel, circular plates 19, 20 and 21, which, conjointly, support a circular series of equidistantly spaced pins 22. The series comprises forty-eight pins in correspondence with the forty-eight quarters in the twelve hours of a day, and the pins are slidably mounted on the plates, to move lengthwise when struck at their rearward ends by the arm 17 on the core of the solenoid 15.

The forward movement of the pins is yieldingly opposed by coiled springs 23 connected between lateral arms 24 at the forward ends of the pins, and secured at the back of the plate by tripping detents 25.

These tripping detents, projecting radially through the space between the plates 19 and 20, are tensioned by a winding movement of the springs 23 with which they are connected, to frictionally and yieldingly engage the surfaces of the pins 22. The latter have series of notches 26, and the detents tensioned by their respective springs, will during lengthwise movement of the pins, successively enter the notches to thereby hold the pins in their projecting positions to which they were moved by the striking action of the core of the solenoid 15.

In order to guide the pins in their lengthwise movement, rods 27 fastened to the arms 24 in parallel relation to the pins 22, project slidingly through apertures in the plates 19, 20 and 21 on which the pins are mounted. A fiber drum 28 is rotatably mounted on the shaft 5 and has at one end a relatively fixed ratchet wheel 29 having forty-eight teeth around its circumference.

Figure 1:
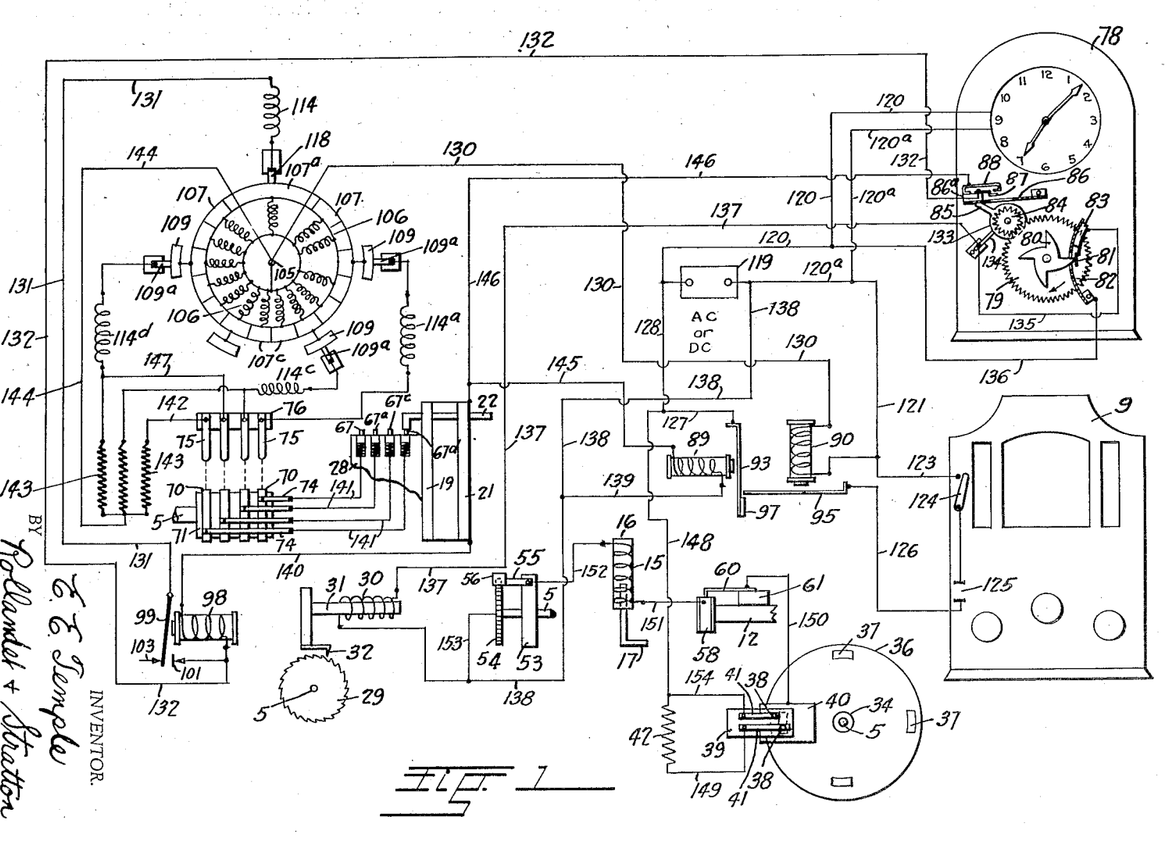
Figure 2:
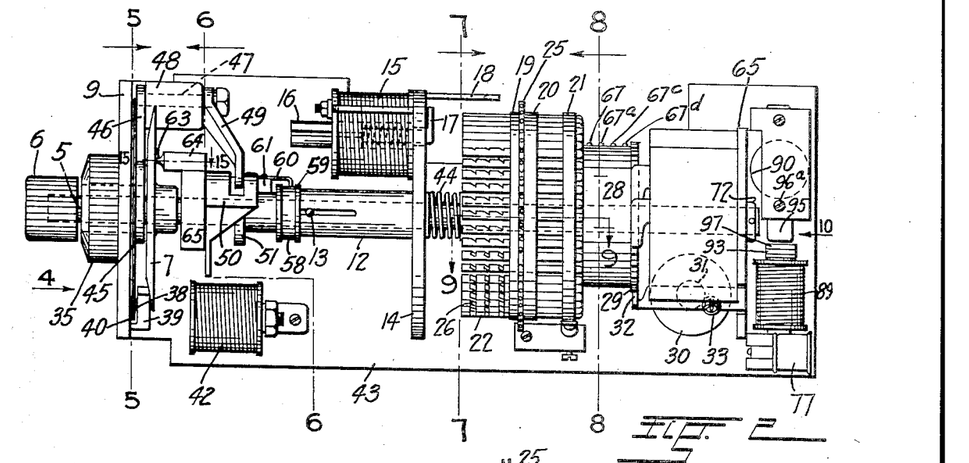
Figure 3:
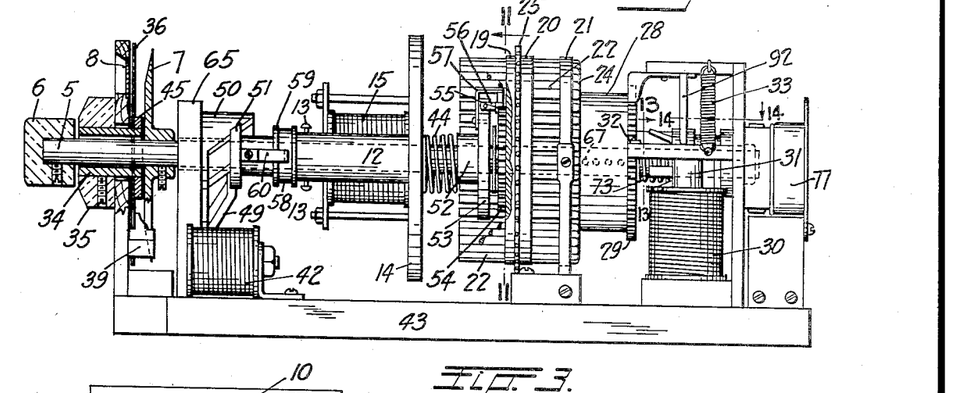
Figure 4:
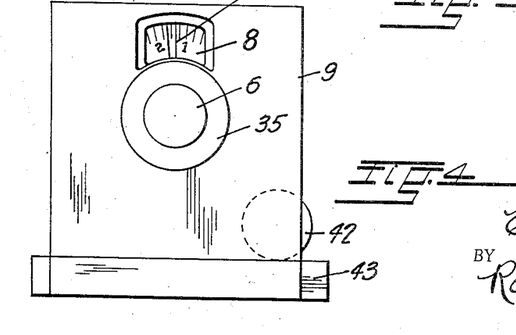
Figure 5:
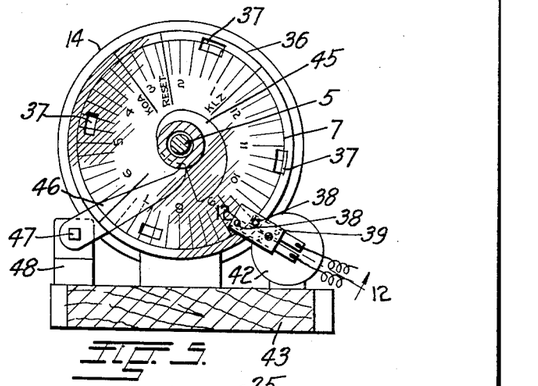

A solenoid 30 has a core 31 provided with a detent 32, best shown in Figure 1, which engages the teeth of the ratchet wheel for rotation of the drum during energization of the solenoid.

A spring 33 returns the core to its original position after each actuation.

Rotatably mounted in the opening in the side of the casing of the instrument through which the shaft 5 extends, is a sleeve 34 provided with a knob 35 between the said side of the casing and the knob 6 at the end of the shaft, for manual rotation of the sleeve.

The sleeve carries a disk 36 of celluloid or other transparent material, having marks visible through the window in the side of the casing, and designating the stations which may be automatically tuned in, in the operation of the present invention.

The transparent disk has peripheral slots 37 for the purpose of causing two contact pins 38 slidably mounted on a non-conductive block 39 fastened in the casing, to separately engage a relatively stationary conductive plate 40, for the purpose of completing circuits in which they are connected.

The contact pins are urged by springs 41 to constantly engage the transparent disk, and to engage the conductive plate when the slots of the disk are brought into register with the contacts, by rotation of the knob 35. The contact pins are at different distances from the center of rotation of the disk 36 and the slots 37 are of correspondingly differing distances from the center, so that one or another of the contact pins may be brought in contact with the plate 4 by rotation of the disk, at the will of the operator.

The circuit of one of the two contacts includes a resistance coil 42 mounted upon the base 43 of the controlling element upon which the supports for the shaft and the plates 19, 20 and 21 are likewise fastened. The circuit of the other contact does not include a resistance for purposes hereinafter to be described.

Rotation of the knob 35 produces lengthwise movement of the sleeve 12 on the shaft 5 against the resistance of a spring 44, for the purpose of moving the core 16 of the solenoid 15 to engage with the ends of the pins 22, and to bring the arm 18 into the circle of the detents 25.

With this object in view, the sleeve 34 has a cam 45 engaging an arm 46 on a shaft 47 rotatably mounted in a bearing 48 on the base of the instrument. A second arm 49 at the other end of the shaft 47 engages with a slotted cam 50 which slides laterally of the shaft 5, to impellently engage a cam 51 contacting at the end of the sleeve 12.

The movement of the sleeve 12 is, as stated before, yieldingly opposed by the spring 44, which is coiled around the shaft 5 between the end of the sleeve, carrying the disk 14, and a sleeve 52 or a non-conductive disk 53, which is fixed on the shaft.

A conductive plate 54 has forty-eight equidistant teeth at its periphery, to engage with a brush 55 mounted on the disk 53 through the medium of an insulating block 56. The brush 55 and the toothed plate 54 are connected at opposite sides of a break in the circuit of the solenoid 15 and a spring 57 on the non-conductive disk 53, insures electric contact between the brush and the teeth of the plate.

When the shaft 5 is rotated by means of the knob 6, the teeth of the plate are brought successively in contact with the brush to intermittently make and break the circuit of the solenoid 15.

A conductive ring 58 insulated from the sleeve 12, by an insulating bushing 59 is engaged by a resilient brush 60 mounted on the cam 51 by means of a non-conductive support 61, for the purpose of maintaining a circuit during rotation of the sleeve 12, as will be more fully explained with reference to Figure 1 of the drawings.

Figure 6:
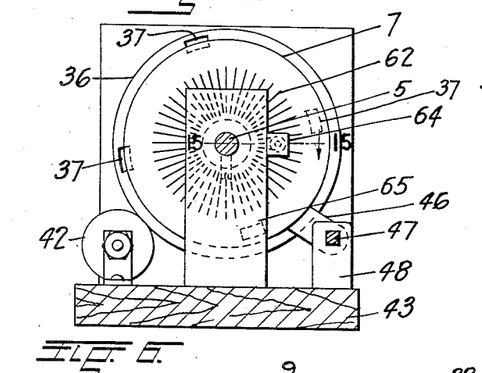
Figure 7:
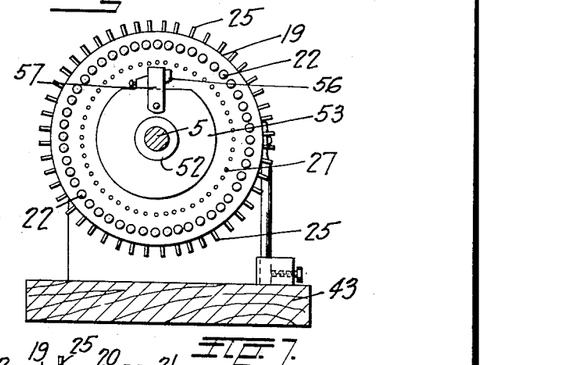
Figure 8:
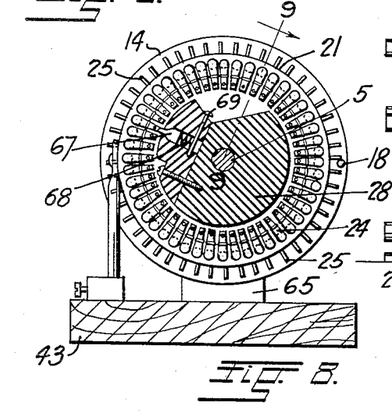
Figure 9:
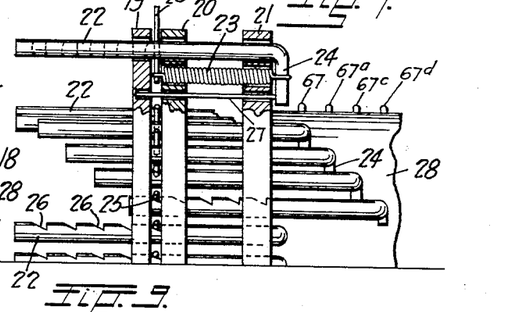
Figures 15, 16:
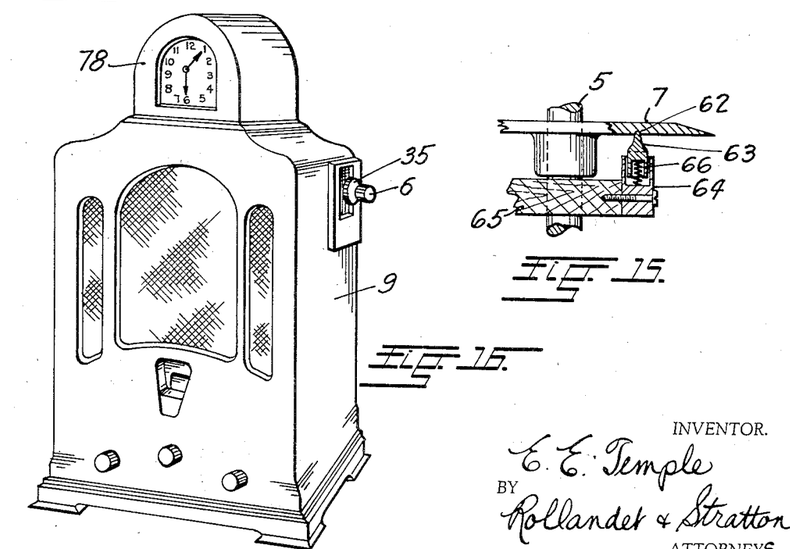
Figure 17:
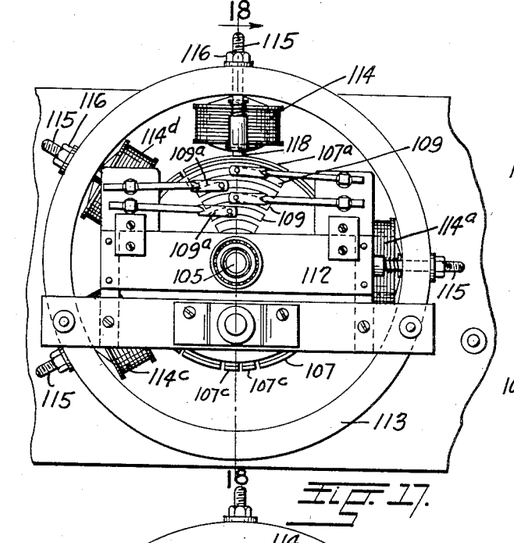
Figure 18:
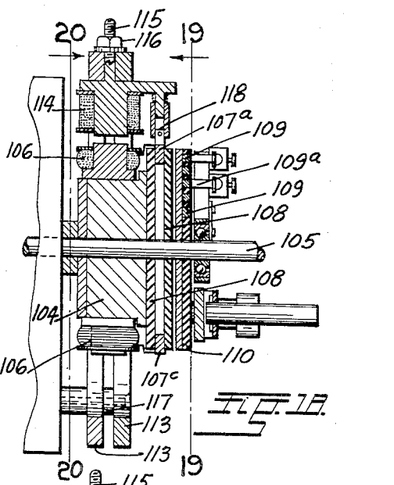
Figure 19:
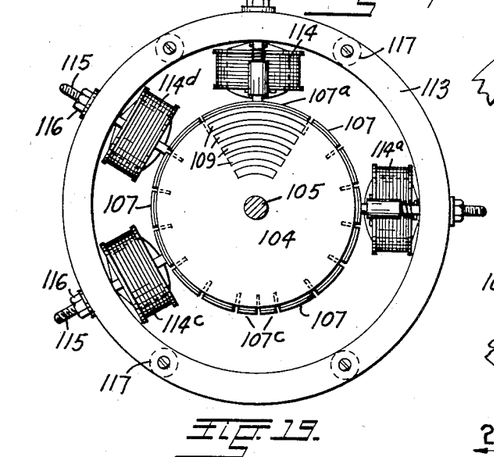
Figure 20:
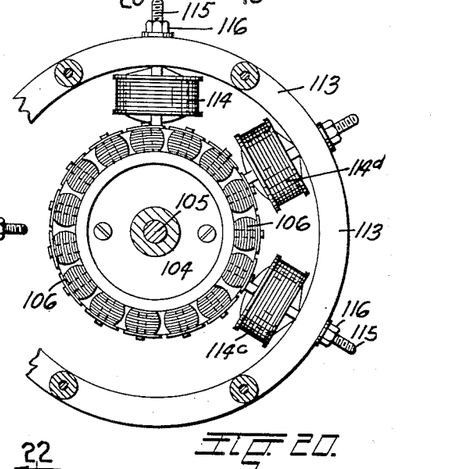

In order to restrict the movement of the shaft 5, the graduated dial has at its back a series of radial grooves 62 (see Figures 6 and 15) that are engaged by a dog 63 movable in a housing 64 on one of the supports 65 for the shaft 5. A spring 66 holds the dog in contact with the dial.

The drum 28 has at its circumference a transverse series of contacts which are engaged by the arms 24 on the pins 22, when the latter are moved forwardly by the striking action of the core 16 of the solenoid 15. There are as many of these brushes as there are stations to be tuned in through the intermediary of the automatic system of the present invention, four having been shown in the drawings, and designated respectively by the reference numerals 67, 67a, 67c and 67d. In order to insure electric contact between the contacts and the pins 22, the contacts are movably mounted in openings of the disk, upon coiled springs 68 bearing on pins 69. The latter also serve to connect the contacts in their respective circuits.

The contacts are maintained in their respective circuits by rings 70 at the circumference of a non-conductive cylinder 71 on the shaft 5. The cylinder moves on the shaft in conjunction with the drum 28. It bears against a collar 72 at the end of the shaft, and a spring 73 coiled around the shaft, spaces the cylinder from the drum.

The rings 70 are connected with the contacts by radiating arms 74. Resilient brushes 75 on a stationary insulating support 76 engage with the rings 70. An adjustable stop 92 limits the movement of the arm carrying the detent 32. A socket 77 serves to connect the automatic tuning system of the present invention into the circuit.

In the operation of the controlling element hereinabove described, in order to set the instrument for the purpose of automatically tuning in one or more of the given broadcasting stations at predetermined intervals in a given period of time, the user rotates the shaft 5 by means of the knob 6 until the graduation on the dial 7 corresponding to the time of beginning of a desired program of one of the broadcasting stations registers with the mark 10 on the window. It is to be remembered that in the construction shown the dial is divided into twelve equal spaces representing the twelve hours of a day, and that each space is subdivided into four equal parts representing quarter hours.

The rotary movement of the shaft brings the core or plunger 16 of the solenoid 15 opposite the pin 22 which corresponds with the time denoted by the graduation registering with the mark on the window 8, so that when subsequently the solenoid 15 is energized it will strike said pin and thereby project its core 16 into line with one or another of the contacts 67. The subsequent engagement of the projected pin with the contact 67, tunes the station represented by the contact, into the instrument. The knob 35 is now rotated by the operator until the mark on the transparent disk 36 representing the desired station is in register with the stationary mark on the window 8.

This rotation of the disk 36, brings one of its notches 37 in register with the contacts 38 which in consequence are permitted to engage the plate 40 thereby closing the circuit of the solenoid 42.

The shaft 5 is now rotated through an arc representing the time during which the selected station is desired to remain in tune, it being remembered that each space on the dial 7 measures one quarter of an hour.

The rotary movement of the shaft causes the brush 55, carried by the disk 53, to intermittently engage the teeth of the conductive plate 54 with the result that solenoid 15 is energized and the pin 22 alined with the core 16 is projected.

The detents 25 engaging the notches of the pins, hold the latter in their projected positions.

The rotary movement of the sleeve 34 on which the disk 36 is mounted, by means of the knob 35, causes a lengthwise movement of the sleeve 12, the extent of which is measured according to the arc through which the disk 36 was turned, or, in other words, according to the position of the mark on the disk, designating the desired station. Therefore, the extent to which the pin 22 is projected by the striking action of the solenoid-core 16, is likewise determined according to the desired station, to engage with the corresponding contact 67 on the rotary drum 28, which is rotated to a position in which the contact 67 is in line with the projected pin by energization of the solenoid 30, which is in circuit with the clock mechanism as will hereinafter be described.

In this manner, any of the stations controlled by the automatic tuning system (four in the construction shown in the drawings) may be selected to be tuned in at a selected time. Any two or more of the four stations can be tuned in consecutively at selected times by turning the dial 7 and the disk 36, at the beginning of the given period, in the manner hereinabove described, successively for each desired period of time and for each selected station.

The pins 22 are thereby projected through different distances to engage with the respective contacts 67 denoting the selected stations. The clock automatically brings the contact into engagement with the respective pin at the beginning of the selected period by energization of the solenoid 30, said engagement being maintained during the period, at the end of which the drum 28 is again rotated by the clock mechanism to bring the contact 67 representing the next following station in line with the respective projected pin 22.

For example, naming the four stations AB, CD, EF and GH, the operator may at the beginning of the day, say at eight o'clock in the morning, set the controlling element of the automatic tuning system so that station AB will be tuned into the instrument from 9:00 to 9:15, CD from 9:15 to 9:30, EF from 10:00 to 10:15, AB again from 10:15 to 10:45, EF from 10:45 to 10:30 and so on through a period of twelve hours. The conductive ring 58 engaged by the brush 60 maintains the electrical connection between the rotating and non-rotary parts.

To reset the controlling element at the end of the day or other given period, the tuning knob 6 is turned to bring a mark on the disk 36, designated by the word "Re-set" into engagement with the mark on the window 8. This advances the sleeve 12 to its extreme position. The contacts 38 are disengaged from the plate 40, so that the solenoid 15 is no longer energized and the resetting pin 18 on the disk 14 is brought in the circle of the detents 25 which hold the pins 22 in their projected positions by engagement with the respective notches 26.

Now, if the knob 6 is rotated counter-clockwise, the consequent rotation of the sleeve 12 with the shaft 5 in the same direction will disengage the detents from the projected pins 22, causing the latter to be retracted to their original positions by the springs 23.

Rotation of the knob 35 caused the sleeve 12 to move forwardly through the intermediary of the arms 46 and 49 on the shaft 47, acting upon the cam 50, with the result that the spring 44 was compressed, and when subsequently the knob 35 is rotated in the opposite direction, and the cam 50 releases the sleeve 12, the sleeve is automatically returned to its original position.

The clock designated by the numeral 78 is, as stated before, of a type electrically operated by its connection in an ordinary lighting circuit. The clock per se, is not a part of the present invention, certain parts of its mechanism having been utilized to control the time-periods during which the stations controlled by the automatic system are tuned into the receiving instrument.

Referring to Figure 1 of the drawings, the reference numeral 79 indicates a toothed wheel of the clock mechanism which makes one complete revolution during each hour. Fixed upon the spindle of the wheel 79 is a four-pointed cam wheel 80, contacting with a brush 81.

The brush is fastened at the end of a curved longitudinally slotted spring 82 by means of an insulating strip 83, which is secured to the frame or casing of the clock. During each revolution of the wheel, the cam, by its four points, enters four times through the slot of the spring thereby contacting the brush 81, at each quarter hour. The spring 82 and the brush 81 are connected at opposite sides of a break in the circuit of the solenoid 30, so that the latter is energized for the purpose hereinbefore recited, at each quarter hour.

In order to assure satisfactory operation of the solenoid and the parts actuated thereby, it is best to maintain the contact between the cam 80, the spring 82 and the brush 81, for about one minute, giving sufficient time to rotate the drum 28 of the controlling element, through the medium of the ratchet wheel 29 and the therewith engaging detent 32. It will be remembered that the ratchet wheel 29 has forty-eight teeth, each representing a fifteen-minute period, so that the drum and the contacts 67 mounted thereon are advanced a distance equal to the distances between the pins 22, each quarter hour.

A pinion 84 of the clock movement meshes with the toothed wheel 79 to make one complete revolution every minute. A conductive disk 133 on the spindle of the pinion has a radial arm 85, contacting with a longitudinally slotted spring 86 fastened on the frame or casing of the clock. The disk 133 is connected in a circuit of the system hereinafter to be described, by means of a finger 134 contacting at its periphery.

Contacts 87 and 88 carried at the free end of the spring 86 upon an insulating block 86a, are brought into engagement with the arm 85 each time the latter slips through the slot of the spring 86, i. e., each time the pinion makes one revolution.

The contacts are in the circuit of the motor hereinafter to be described, they are maintained in engagement for a short period of about two seconds each, during which time the motor is actuated to tune a selected station into the instrument.

The clock mechanism thus controls the operation of the motor and also controls the circuits of the solenoid 30, as stated hereinbefore. The clock mechanism furthermore controls the circuits of electromagnets 89 and 90 forming part of an automatic switch 91 which, as stated hereinbefore, controls the circuit of the receiving instrument.

Figure 10:
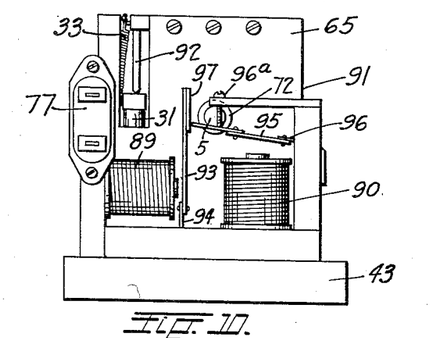
Figure 11:
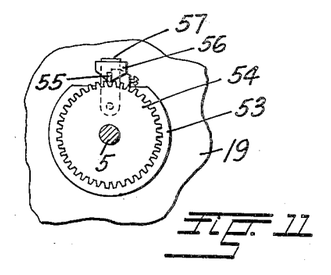
Figure 12:
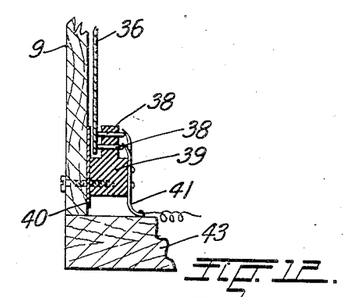
Figure 13:
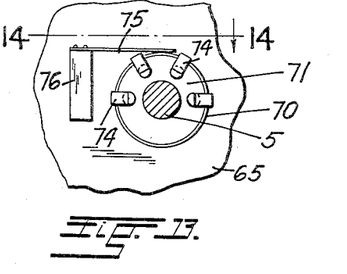
Figure 14:
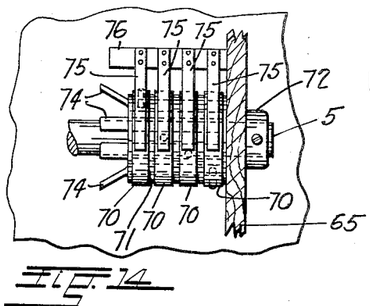

The automatic switch, best shown in Figure 10, comprises the above mentioned electromagnets 89 and 90. The magnet 89 has an armature 93 mounted on a spring 94, and the magnet 90 has an armature 95 mounted on a spring 96. An adjustable stop 96a limits the movement of the armature 95, and a non-conductive strip 97 at the end of the armature 93 serves to arrest the movement of the armature 95.

Figure 21:
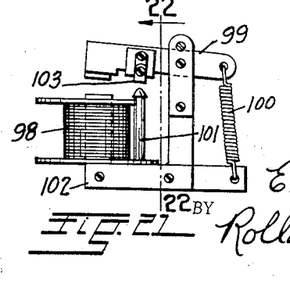
Figure 22:
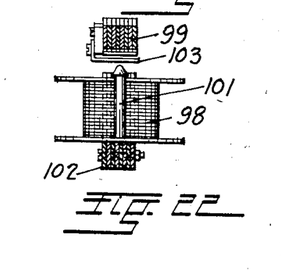

The relay shown in Figures 21 and 22, comprises an electromagnet having a coil 98 and a pivoted, laminated armature 99 connected with a return-spring 100. A carbon pin 101 is mounted on the laminated base 102 of the relay and a contact 103 on the armature 99 is disposed to engage the pin 101 when the armature is attracted to the coil against the resistance of the spring.

The motor hereinbefore repeatedly referred to has been shown in Figures 17 to 20 of the drawings. It comprises a solid commutator cylinder 104 mounted on the shaft 105 of the tuning element or condenser of the radio-receiving instrument. The cylinder supports at its periphery a plurality of equidistantly spaced armature coils 106 and a number of segmental contact plates 107 are separately connected with the coils. The contact plates are fastened in circular alinement between two non-conductive disks 108 on the condenser shaft 105.

Additional segmental contact plates 109 are mounted in concentric relation to each other upon a non-conductive disk 110 likewise mounted on the shaft of the condenser. The contact plates 109 are engaged by adjustable brushes 109a mounted on the stationary motor frame 112.

A fixed field element consists of a pair of spaced rings 113 concentric with the shaft of the condenser, which support a plurality of field coils 114, 114a, 114c, and 114d. The field coils correspond in number to the stations controlled by the automatic tuning system of the present invention, there being four in the example given in the drawings.

The field coils 114 are suspended inside the rings by bolts 115 and nuts 116, so that their position may be adjusted in the circle of rotation of the armature. Washers 117 space the rings apart. The pole face of the field magnets is convex, resulting in relatively stronger magnetic pull at its lowest point, since the air gap between the armature magnets and the field magnets is reduced to a minimum at this point. If, however, the shape of the pole face of the field magnets was concave, as in all conventional type electric motors, it would be impossible to stop the rotation of the armature, so that it would stop in absolutely the same position every time, because the relative pole areas of any one of the field magnets and any one of the armature magnets are so vastly different, consequently the magnetic pull or air gap between the armature magnets and the selected field magnets is the same thru an arc depending on the relative size of the field magnet.

Suspended from the frames of one or more of the field magnets are brushes 118 which contact with the segmental contact plates 107. One of then segmental contact plates 107a, is longer than the others, and opposite to this longer segment are two smaller plates 107c. The segmental plates 109 are separately in circuits with the field coils 114.

In the motor shown, through the medium of the relay 98 the field coil 114 is always energized first irrespective of the station to be tuned in, after which the field coil corresponding to the desired station is energized. For correct functioning of the motor, there should be an odd number of armature coils splitting the circle evenly (fifteen coils being shown in Fig. 20), according to opposite directions of rotation. The odd armature coil is connected to the long segment 107a, it being understood that if the energized field coil is at the left of the long segment, the direction of rotation of the armature will be counter-clockwise, whereas if the energized field coil is to the right of the long segment, the direction of rotation will be clockwise.

When the field coil 114 is energized, the armature coil 106, connected with the contact plate 107 engaged by the brush 118 of the field coil 114, is also energized thus causing the armature, and with it the shaft of the tuning element, to rotate to bring the brush of the field coil in engagement with the long segment.

As brush 118 passes over the segments 107, it successively makes and breaks the circuit of the armature coils until the brush comes in contact with the long segment 107a, bringing the field coil 114 directly opposite the energized armature coil 106, connected to the long segment 107a, thereby causing the armature to stop due to the prolonged magnetic attraction between the field coil and the armature coil. This movement of the armature rotates the condenser shaft through the correct arc to tune the desired station into the instrument.

Since the limited dimensions of the motor do not permit of placing the field coils corresponding with the broadcasting stations having wave lengths slightly different from the master station represented by field coil 114, at the proper positions relative to the field coil 114, to turn the condenser shaft through the arcs required to tune said broadcasting stations of different wave lengths into the instrument, the additional segmental plates 109 are provided. These plates are directly connected with four of the armature coils, which are also attached to the plates 107, while the brushes 109a are electrically connected with the field coils, thus making it unnecessary to place the field coils in the circle of the motor, in their correct relative positions to correspond with the angles through which the condenser shaft must be turned to tune the corresponding broadcasting stations into the instrument.

If the condenser movements representing the four broadcasting stations are sufficiently different in the sizes of their arcs to permit setting the field coils in the circle of motion of the armature, so that the latter may turn through the required arcs from one field coil to another, then the additional segments 109 and the brushes 109a will not be required and all the field magnets will be equipped with brushes as shown at 118.

The short segments 107c have no particular function in the operation but being opposite the long or stop segment 107a, they divide the circle according to opposite directions of rotation, it being understood that if the energized field coil is at the left of the long segment 107a, the direction of rotation of the armature will be counter clockwise, whereas if the energized field coil is to the right of the segment 107a, the direction of rotation will be clockwise.

Having thus described the constructions, objects and operations of the several elements comprised in the system, their electrical connections for their cooperative actions will now be described with reference to Figure 1 of the drawings.

The time mechanism of the clock 78 is connected in the same circuit with the radio receiving instrument, the source of which is indicated at 119. In this connection, it will be observed that while the source 119 has been indicated in Figure 1 of the drawings as "AC," the device is equally adapted for use with either alternating current or direct current. The circuit has been shown at 120 and 120a. The radio-receiving instrument 9 is connected in a circuit controlled by the automatic switch 91.

Beginning at the source 119, the circuit is as follows: the conductors 120a, 121 and 123, the switch 124 and the socket 125 of the instrument, the conductor 126, the armatures 95 and 93 of the electromagnets 90 and 89 of the automatic switch and the conductors 127 and 128.

After one or more of the pins 22 of the controlling element have been set by the manual operation hereinbefore described, to contact with respective contacts 67 on the drum 28, the drum is rotated by means of the ratchet wheel 29 and the detent 32, through the instrumentality of the clock mechanism, which energizes the solenoid 30 by a flow of current through the following circuit.

Beginning at the source of electricity, the conductor 129, the conductor 136, the spring 82 and the brush 81, which are brought into contact each quarter hour by the rotary motion of the cam 80 on the clock wheel 79, conductors 135 and 137, the solenoid-coil 130, and the conductor 138 connecting at the opposite end of the source.

The rotation of the pinion 84 by means of the toothed wheel 79, completes the motor circuit by means of the contacts 86 and 87. The circuit beginning at the source 119 being as follows: The conductors 120 and 136, the spring 82 and the brush 81 which are still in contact, the conductor 135, the finger 134, the conductive disk 133, the arm 85 of the disk, the brush 87, the conductor 132, the relay coil 98 which was energized through completion of its circuit by the contact of the pin 22 and the brush 67d, through the conductor 140, the disk 21 of the controlling instrument, the pin 22, the contact 67d, the conductor 141, the radiating arms 74 in the rings 70 connecting with the contact-brushes 67, the resilient brushes 75 contacting with the rings 70, the conductor 142, a resistance 143, conductor 144, the armature frame 105 of the motor, which connects with the source as hereinbefore explained.

Energization of the coil of the electromagnet 98, brought the contacts 103 and 101 in engagement, thereby completing the motor circuit through the conductor 131, the field coil 114 of the motor, the brush 118, the contact plates 107 of the rotary armature of the motor, the armature coils 106, the conductive cylinder 104 of the armature, the shaft 105 on which the cylinder is mounted, the conductor 139, the coil of the electromagnet 90 of the automatic switch, and the conductor 129 and 121 connecting with the opposite side of the source.

The coil of the electromagnet 89 of the automatic switch is simultaneously energized since it is connected in a shunt of the before-mentioned circuit as follows: the conductor 139 connecting with conductor 138, the windings of the coil 89, and the conductor 145 connecting with the disk 21. Energization of the electromagnet coils 89 and 90 of the automatic switch, brings their respective armatures 95 and 93 into engagement, thereby completing the circuit of the radio hereinbefore described. The master field coil 114 of the motor is energized under all conditions through the relay but if stations other than that corresponding with the master coil are selected, then the field magnet corresponding with the selected station is directly energized as follows: Again beginning at the source, to the radial arm 85 in the clock-controlled mechanism, making contact with brush 88 by continued rotation of the pinion, the conductor 146, the disk 21, the pin 22, the contact-brush 67 corresponding with the selected station, the respective conductor 141, the corresponding arm 74, ring 70 and brush 75, the conductor 147, the field coil 114d, corresponding with the selected station, the respective brush 109a and segmental contact plate 109, the armature coil 106, and thence through the automatic switch to the source as before.

It will be observed that in each case, the automatic switch completes the circuit for turning on the radio-receiving instrument. The solenoid 15 by which the pins 22 are caused to be projected for engagement with the contact-brushes 67, is energized by engagement of either pin 38 with the conductive plate 40, said engagement being controlled by the adjusted position of the disk whose slots register with the pins.

The pin nearest the center of rotation of the disk is in the circuit of the solenoid 15 as follows:

Beginning at the source 119, the conductor 128, the conductor 148, the resistance coil 42, the conductor 149, the respective pin 41, the therewith engaging contact pin 38, the contact plate 40, the conductor 150, the brush 60 and the therewith engaging ring 58, the conductor 151, the windings of the solenoid 15, the conductor 152, the brush 55, the toothed plate 54, the conductor 153, and the conductor 138 to the source.

The other pin 38, farther away from the center of rotation is in the same circuit but excluding the resistance coil 42, by direct connection with the conductor 48, as shown at 154. By eliminating the resistance from the circuit of the solenoid 15, the core 17 thereof will deliver a more forceful blow upon the pins 22, thereby insuring the core 17 to reach the end of its stroke against the increased tension of springs 23, when the pins are intended to engage with the farthest of the contacts 67. When the resistance is in the circuit, the blow delivered by the solenoid core, being of less velocity, will move the pins 22 a shorter distance to engage the nearer contacts 67.

The operation of the system is as follows: The clock being directly connected in the lighting circuit, is always in operation. After the receiving instrument has been connected in the circuit by closing the switch 124, and the automatic tuning system is likewise connected in the circuit through the medium of the socket 77, the operator having determined the programs he desires to hear during given periods of the day, first turns the knob 6 at the end of the shaft 5 until the graduation on the dial 7, representing the time of beginning of the first program, registers with the mark 10 on the window 8.

Rotation of the shaft 5 causes the solenoid 15 to move opposite to one of the pins 22, to engage the same by movement of its core when the solenoid is subsequently energized.

The operator now turns the knob 35 until the mark on the transparent disk 36, representing the station broadcasting the desired program, is in register with the mark 10 on the window 8. This rotary movement of the knob 35 causes one or the other of the pins 38 to contact the conductive plate 40, by its registration with one of the slots 37, thereby closing the respective circuit of solenoid 15 at that point.

Further rotation of the knob 6 closes the circuits of the solenoid 15, by engagement of the brush 55 with the teeth of the conductive plate 54, with the result that its core strikes the thereto opposite pin 22.

The rotation of the knob 35 also advances the position of the solenoid-carrying disk 14 toward the series of pins 22, through the medium of cams 50 and 51, it being understood that the extent to which the disk is advanced, is determined by the arc of rotation of the knob, or, in other words, by the location of the station-indicating mark on the disk 36.

An object of the rotary movement of the disk is to determine the position of one of the pins 22, projected by movement of the core 16 of the solenoid 15 when the latter is consequently energized, relative to one of the brushes 67, the position of the pin 22 being determined by the position of the disk 14 and the force of the blow of the core 16 upon the end of the pin.

The time of beginning of the first program having now been determined, the next move is to establish the length of the period during which the station broadcasting the program will be tuned into the instrument. This is accomplished by again turning the knob 6 according to the length of the period, it being remembered that each graduation on the dial 7 represents a quarter hour period. Therefore, if the dial is turned from its first adjusted position to bring the next following graduation in register with the mark 10 on the window, the duration of the program will be one quarter of an hour, and so on.

Repeated rotation of the shaft 5, breaks the solenoid circuit by disengagement of the brush 55 and the teeth of the plate 54, thereby returning the core to its original position, which determines the end of the quarter hour period.

It must be remembered that there are forty-eight pins 22 in the series, each representing a quarter-hour period, so that as many pins are projected as there are quarter hours in the selected periods during which the programs are broadcasted.

The pins 22 are held in their projected positions by the engagement of the tripping detents 25 in the notches 26, the distances between the notches corresponding with the distances between the brushes 67.

The position of the arms on the pins 22 relative to the contact brushes 67, determines the broadcasting station to be tuned in. The position of the projected pins in the circle of the series determines the times of beginning and ending of the program and by repeating the above described operations in succession at the beginning any number of stations during any predetermined periods of time, may be consecutively tuned into the instrument during the day, without further attention on the part of the operator.

At the end of the day or other given period, the operator may return the parts of the controlling element to their original positions by turning the knob 35 to the position in which the mark designated "Re-set" on the disk 36, registers with the mark on the window. This advances the disk 14 to bring the resetting pin 18 in the circle of the tripping detents 25, at the same time discontinuing the engagement of the contact pins 38 with the plate 40 to break the solenoid circuit. When subsequently the knob 6 is turned in counter clockwise direction, the rotation of the disk 14 will cause the pin 18 to successively engage the tensioned detents 25 thereby releasing the pins 22 and causing the latter to return to their original positions under the influence of their springs 23, ready to be set again for another period of automatic tuning.

At the time of beginning of the first program, as was established by the first manipulation of the knob 6, cam wheel 80 closes the circuit of the solenoid 30 thereby advancing the ratchet wheel 29, one tooth, which represents a quarter hour period, there being forty-eight teeth at the circumference of the wheel. The drum 28 is consequently rotated through a similar arc, thereby bringing the brush 67 representing the selected station, in contact with the pin 22 which was projected by rotation of the knob.

Further rotation of the gear wheel 79 with which the cam wheel 80 is connected, causes the contacts 85 and 87 to close the circuit of the motor. This energizes the master field coil 114, with the result that the armature is advanced through the arc required to tune in the master station through the medium of the condenser or tuning element of the receiving instrument.

The field coil 114a, corresponding with the selected station was connected in circuit by the engagement of the pin 22 with the respective brush 67, which circuit was closed by engagement of the contact arm 85 with contact 88 of the clock movement, and the energization of the armature coil connected to segment 109 contacted by brush 109a creates the magnetic attraction to the field coil which rotates the armature and therewith the condenser, through the required arc.

Engagement of the arm 85 with contacts 87 and 88 also completes the circuits of the electromagnets 89 and 90 of the automatic switch which connects the receiving instrument in the motor circuit. The circuits controlled by the rotation of the pinion 84, are completed during a period sufficiently long to produce the above stated results, and are subsequently broken.

The broadcasting station remains in tune during the selected period at the termination of which the circuit controlled by the movement of the cam wheel 80 is again closed by contact of the brush 81 and the spring 82 with the result that the ratchet wheel 29 is advanced another tooth and the drum 28 is rotated to bring either the same brush 67 or another brush 67 into contact with the pin 22, which was projected by the second manipulation of the knob 6.

If it were desired to have one station remain in tune for more than one-quarter of an hour, which is in the construction shown in the drawings, the time unit of the controlling element, the same brush 67 will be contacted by the second projected pin 22, or if at the end of the first time unit it is desired to tune in another selected station, the brush 67 corresponding with said station will be contacted by the second projected pin 22. As soon as the circuits are broken by disengagement of the arm 85 with contacts 87 and 88 the consequent deenergization of the electromagnets of the automatic switch closes the circuit which connects the receiving instrument electrically with the lighting circuit, it being understood that the connection of the receiving element in the lighting circuit is permanently established at the socket 125.

If the time periods for tuning in selected stations are separated by an interval during which no station is tuned into the instrument, the drum 40 will be rotated each quarter hour or other time unit during said interval without bringing any of the pins 22 into engagement with a brush 67.

The operation of the automatic switch is, specifically, as follows: After the clock completes the circuit of the solenoid 30, the electromagnet 89 is energized attracting armature 93 which carries the insulating block 97. The electromagnet 90 is in the motor circuit, and when the motor circuit is closed in the clock, said magnet is energized, attracting armature 95. Normally the armatures are in the position shown in Figure 10, in which the armature 95 engages the insulating block 97 and the circuit of the receiving instrument is broken.

Inasmuch as the armature 93 is attracted to its coil at the same time that the armature 95 is attracted to its coil, deenergization of the coils when their circuits are broken in the clock, will cause the armatures to engage each other with the result that the circuit of the receiving element is closed.

If during any rotation of the drum 28, no brush 67 is brought into contact with a pin 22, as during intervals between programs, the circuit of the motor is not completed at that point, the relay 98 is not operated, and electromagnet 90 is not energized thereby allowing armature 95 to return to its original position when released by the armature 93 whose coil is always energized during the same period.

When subsequently the coil 89 is deenergized in the clock, the insulating block 97 at the end of its armature 93, will again engage the armature 95, so that during intervals between programs, the circuit of the receiving element is not connected in the lighting circuit.

It must be remembered that the electric clock, the receiving instrument and the solenoid 15 are directly connected in the lighting circuit, the source of which is shown at 119, while the other elements of the system are controlled by the clock movement through rotation of the gear wheels 79 and 84.

It has been explained heretofore, how the motor turns the condenser or tuning element through the arc required to tune a selected station into the instrument. The master field magnet which corresponds with the receiving station, best chosen by its average position on the tuning element with relation to other stations on the element having slightly differing arcs, is always energized at the commencement of each operation of the motor, and the armature magnet connected to the long segment is attracted by completion of the circuit through the relay 98.

If, however, the selected station is one of slightly different wave length, the field magnet 114 is, as stated before, first energized by the engagement of the contact arm 85 with contact 87, which closes the circuit to the field magnet through the function of the resistance 143, the relay 98 causing the motor armature to rotate the tuning element.

After the motor circuit is thus completed, further rotation of the pinion 84 bring the contact arm 85 in contact with brush 88, thereby completing the circuit controlled by the pins 22 and brushes 67, thereby energizing the field magnet corresponding with the selected station. The energized field magnet attracts its corresponding armature magnet which is connected to the long segment contacted by the brush of the field coil, thereby rotating the tuning element or condenser through the arc required to tune in the selected station.

The automatic switch is again operated in the manner hereinbefore described with the result that the circuit to the receiving element is closed.

This will explain the necessity of the long segment 107a always contacted by the brush 118 of the field coil 114, and of the additional segmental contact plates 109. It will be apparent that when two broadcasting stations differ but slightly in their wave lengths, the arcs through which the tuning element must move to tune these stations into the instrument, differ but little correspondingly, and owing to the necessarily limited size of the motor, the field magnets corresponding to said stations, would be so close together at the circumference of the circular field to interfere one with another.

By providing the auxiliary contact plates 109 on the face of the cylinder 104, the field magnets may be placed apart at any desired distance.

It will be understood that the motor as shown and described may also be used to tune selected broadcasting stations into a receiving instrument at points remote therefrom, by eliminating the time-mechanism and the control element and closing the circuits of the field magnets corresponding with the stations, and the respective armature magnets, through the medium of push buttons or other manually operated switches.

As stated before, the receiving instrument may be operated independent of the automatic tuning system, by disconnecting the circuits included in the system at the socket 77, and the system is capable of operation by both direct and alternating currents.

Variations in the construction and relative connections of the various elements comprised in the system, may be made without departing from the scope and spirit of the invention as herein set forth.

What I claim and desire to secure by Letters Patent is:

1. Control system for radio receiving instruments, comprising in combination with a receiving instrument and the tuning element thereof, an electromagnetic motor, having in rotative connection with the tuning element, a rotary armature including a plurality of coils in its circle of rotation, the field of the motor including a plurality of electromagnets corresponding with a number of radio sending stations, and disposed in the circle of rotation of the armature, a normally open circuit for the instrument, a circuit including the motor-armature coils, selective controlling means for the motor circuit, adapted to close the circuit through any selected field magnet, whereby to rotate the armature by magnetic attraction of said field magnet to the coils, conductive members in the circle of rotation of the armature, separately associated with the coils for their attraction to the core of the energized field magnet, the conductive member of one of the coils, being longer than those of the other coils to arrest further rotation of the armature by continued attraction of the field magnet, whereby the armature is rotated through a predetermined arc, and an electromagnetic switch element energized by closing of the motor circuit, to close the circuit of the receiving instrument.

2. Control system for radio receiving instruments, comprising in combination with a receiving instrument and the tuning element thereof, an electromagnetic motor, having in rotative connection with the tuning element, a rotary armature including a plurality of coils in its circle of rotation, the field of the motor including a plurality of electromagnets corresponding with a number of radio sending stations, and disposed in the circle of rotation of the armature, a normally open circuit for the instrument, a circuit including the motor-armature coils, selective controlling means for the motor circuit, adapted to close the circuit through any selected field magnet, whereby to rotate the armature by magnetic attraction of said field magnet to the coils, conductive members in the circle of rotation of the armature, separately associated with the coils for their attraction to the core of the energized field magnet, the conductive member of one of the coils being longer than those of the other coils to arrest further rotation of the armature by continued attraction of the field magnet, whereby the armature is rotated through a predetermined arc, auxiliary conductive members upon a face of the armature, likewise separately associated with the coils, brushes cooperative with the auxiliary conductive members, in separate connection with the field magnets, and an electro-magnetic switch element energized by closing of the motor circuit, to close the circuit of the receiving instrument.

3. Control system for radio receiving instruments, comprising in combination with a receiving instrument and the tuning element thereof, an electromagnetic motor having a rotary armature in rotative connection with the tuning element, and having a plurality of field magnets in the circle of rotation of the armature, corresponding with a number of radio sending stations, a time-controlled switch element controlling the motor circuit, an electric controlling element adapted to be set to predetermine the time of actuation of said time-controlled switch element, a circuit for the controlling element, a time-controlled switch for the last mentioned circuit, means controlled by said controlling element for including any selected field magnet in the motor circuit, a normally open circuit for the receiving instrument, and an electromagnetic switch element energized by closing of the motor circuit, to close the circuit of the receiving instrument.

4. Control system for radio receiving instruments comprising in combination with a receiving instrument and the tuning element thereof, an electromagnetic motor having a rotary armature in rotative connection with the tuning element, and having in the circle of rotation of the armature, a primary field magnet and secondary field magnets, corresponding with a number of radio sending stations, a circuit including the motor-armature, a time-controlled switch element adapted to close the motor circuit successively through the primary field magnet and a selected secondary field magnet, a controlling element in electric association with the time-controlled switch element and adapted to predetermine the time of operation of the time-controlled switch and the selected secondary field magnet, a circuit for the receiving instrument, and an electromagnetic switch element energized by closing of the motor circuit, to close the circuit of the receiving instrument.

5. Control system for radio receiving instruments comprising in combination with a receiving instrument and the tuning element thereof, an electromagnetic motor having a rotary armature in rotative connection with the tuning element, and having in the circle of rotation of the armature, a primary field magnet and secondary field magnets, corresponding with a number of radio sending stations, a circuit including the motor armature, a time-controlled switch element adapted to close the motor circuit successively through the primary field magnet and a selected secondary field magnet, a controlling element in electric association with the time-controlled switch element and adapted to predetermine the time of operation of the time-controlled switch and the selected secondary field magnet, a circuit for the controlling element, a time-controlled switch for the last mentioned circuit, a circuit for the receiving instrument, and an electromagnetic switch element energized by closing of the motor circuit, to close the circuit of the receiving instrument.

6. Control system for radio receiving instruments comprising in combination with a receiving instrument and the tuning element thereof, an electromagnetic motor having a rotary armature in rotative connection with the tuning element, and having in the circle of rotation of the armature, a primary field magnet and secondary field magnets, corresponding with a number of radio sending stations, a circuit including the motor armature, a clock movement including two gear wheels rotating at different rates of velocity, a switch actuated by movement of one of the gear wheels to close the motor circuit successively through the primary field magnet and a selected secondary field magnet, a controlling element adapted to predetermine the time of operation of the time-controlled switch, a circuit for the controlling element, a switch in the last mentioned circuit, actuated by rotation of the other gear wheel, a circuit for the receiving instrument, and an electromagnetic switch energized by closing of the motor circuit, to close the circuit of the receiving instrument.

7. Control system for radio receiving instruments comprising in combination with a receiving instrument and the tuning element thereof, a motor including an armature in rotative connection with the tuning element, and having a plurality of field magnets corresponding with a number of radio sending stations, a circuit for the motor, a circuit for the receiving instrument, an electromagnetic switch energized by closing of the motor circuit to close the circuit of the receiving instrument, a controlling element including a rotary drum, electric contacts on the drum, corresponding with the field magnets, a series of contact fingers representing equal divisions of a period of time and separately projectable to engage one or another of the contacts, the contacts and the contact fingers being in the motor circuit, an electromagnetic hammer to effect the projection of the contact fingers, said hammer being mounted for rotation to register with a selected contact finger and being mounted for lengthwise movement to determine the extent of projection of the selected finger, manually movable time-indicating means for rotation of the hammer, manually movable station-indicating means for lengthwise movement of the hammer, a circuit for the hammer, a switch in the hammer circuit, controlled by movement of the station-indicating means, an intermittent circuit breaker in the hammer circuit controlled by movement of the time-indicating means, electrical means for rotation of the drum, a circuit for said electrical means, a time movement, and a switch actuated by the time movement to close the last mentioned circuit for rotation of the drum at predetermined periods in the operation of the time movement.

8. Control system for radio receiving instruments comprising in combination with a receiving instrument and the tuning element thereof, a motor including an armature in rotative connection with the tuning element, and having a plurality of field magnets corresponding with a number of radio sending stations, a circuit for the motor, a circuit for the receiving instrument, an electromagnetic switch energized by closing of the motor circuit to close the circuit of the receiving instrument, a controlling element including a rotary drum, electric contacts on the drum, corresponding with the field magnets, a series of spring-controlled contact fingers representing equal divisions of a period of time and separately projectable to engage one or another of the contacts, the contacts and the contact fingers being in the motor circuit, an electromagnetic hammer to effect the projection of the contact fingers, said hammer being mounted for rotation to register with a selected contact finger and being mounted for lengthwise movement to determine the extent of projection of the selected finger, means for holding the contact fingers in their projected positions, manually movable time-indicating means for rotation of the hammer, manually movable station-indicating means for lengthwise movement of the hammer, a circuit for the hammer, a switch in the hammer circuit controlled by movement of the station-indicating means, an intermittent circuit breaker in the hammer circuit controlled by movement of the time-indicating means, means to release the projected contact fingers from the holding means by a reverse movement of one of the manually movable indicating means, electrical means for rotation of the drum, a circuit for said electrical means, a time movement, and a switch actuated by the time movement to close the last mentioned circuit for rotation of the drum at predetermined periods in the operation of the time movement.

9. An electric control system, comprising an electromagnetic motor having a rotary armature including a plurality of coils in its circle of rotation, the field of the motor including a plurality of electromagnets disposed in the circle of rotation of the armature, a normally open circuit for the motor, a circuit including the armature coils, selective controlling means for the motor circuit adapted to close said circuit thru any selected field magnet whereby to rotate the armature by magnetic attraction of the said field magnet to the armature coils, conductive members in the circle of rotation of the armature, separately associated with the coils for their attraction to the core of the energized field magnet, and the conductive member of one of the armature coils being longer than those of the other armature coils to arrest further rotation of the armature by attraction of the field magnet, whereby the armature is rotated thru a predetermined arc.

10. An electrical control system, comprising an electromagnetic motor having a rotary armature including a plurality of coils in its circle of rotation, the field of the motor including a plurality of electromagnets disposed in the circle of rotation of the armature, a normally open circuit for the motor, a circuit including the motor armature coils, selective controlling means for the motor circuit adapted to close said circuit thru any selected field magnet, whereby to rotate the armature by magnetic attraction of said field magnet to the armature coils, conductive members in the circle of rotation of the armature, separately associated with the coils for their attraction to the core of the energized field magnet, the conductive member of one of the armature coils being longer than those of the other armature coils to arrest further rotation of the armature by continued attraction of the field magnet, whereby the armature is rotated thru a predetermined arc, auxiliary conductive members upon the face of the armature likewise separately associated with the coils, and brushes cooperative with the auxiliary members, in separate connection with the field magnets.

11. An electrical control system, comprising an electro-magnetic motor having a rotary armature including a plurality of equidistantly spaced coils in its circle of rotation, the field of the motor including a plurality of electromagnets disposed in the circle of rotation of the armature, a normally open circuit for the motor, a circuit including the motor armature coils, selective controlling means for the motor circuit adapted to close said circuit thru any selected field magnet, whereby to rotate the armature by magnetic attraction of said field magnet to the armature coils, conductive members in the circle of rotation of the armature, separately associated with the coils for their attraction to the core of the energized field magnet, and the conductive member of one of the armature coils being longer than those of the other armature coils to arrest further rotation of the armature by continued attraction of the field magnet, whereby the armature is rotated thru a predetermined arc.

12. An electrical control system, comprising an electro-magnetic motor having a plurality of equidistantly spaced coils in its circle of rotation, the field of the motor including a plurality of electro-magnets disposed in the circle of rotation of an armature, the pole faces of said field magnets being convex, whereby to stop the rotation of the armature at a predetermined point with relation to said field magnets, a normally open circuit for the motor, a circuit including the motor armature coils, selective controlling means for the motor circuit adapted to close said circuit thru any selected field magnet, whereby to rotate the armature by magnetic attraction of said field magnet to the armature coils, conductive members in the circle of rotation of the armature, separately associated with the coils for their attraction to the core of the energized field magnet, and the conductive member of one of the armature coils being longer than those of the other armature coils to arrest further rotation of the armature by continued attraction of the field magnet, whereby the armature is rotated thru a predetermined arc.

ERNEST E. TEMPLE.